US012783363B2

(12) United States Patent
Sethi et al.

(10) Patent No.: US 12,783,363 B2
(45) Date of Patent: Nov. 3, 2026

(54) INTELLIGENT CRASH AUTO-RECOVERY

(71) Applicant: Dell Products L.P., Round Rock, TX (US)

(72) Inventors: Parminder Singh Sethi, Punjab (IN); Pandiyarajan Mani, Gudiyattam (IN); Akbar Sheriff, Salem (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/930,670

(22) Filed: Oct. 29, 2024

(65) Prior Publication Data

US 2026/0119339 A1 Apr. 30, 2026

(51) Int. Cl.
*G06F 11/14* (2026.01)
*G06F 11/1446* (2026.01)

(52) U.S. Cl.
CPC ...... *G06F 11/1469* (2013.01); *G06F 11/1433* (2013.01); *G06F 11/14* (2013.01)

(58) Field of Classification Search
CPC ... G06F 11/1469; G06F 11/1433; G06F 11/14
USPC ........ 711/172, 170
See application file for complete search history.

(56) References Cited

U.S. PATENT DOCUMENTS

| | | | | |
|---|---|---|---|---|
| 2008/0046710 | A1* | 2/2008 | Maddocks | G06F 8/656 713/2 |
| 2018/0322012 | A1* | 11/2018 | Sharma | G06F 21/572 |
| 2019/0354361 | A1* | 11/2019 | Li | G06F 8/65 |
| 2023/0046674 | A1* | 2/2023 | Liu | G06F 11/1448 |

* cited by examiner

*Primary Examiner* — Hosain T Alam
*Assistant Examiner* — Zubair Ahmed
(74) *Attorney, Agent, or Firm* — Jackson Walker L.L.P.

(57) ABSTRACT

An information handling system may include at least one processor, a memory, and a plurality of information handling resources each including a firmware. The information handling system may be configured to: periodically perform a backup operation on the firmwares to store at least one functioning version of each firmware; detect a corrupted one of the firmwares; and re-program the corrupted firmware with the corresponding at least one functioning version of the firmware.

19 Claims, 2 Drawing Sheets

INTELLIGENT CRASH AUTO-RECOVERY

TECHNICAL FIELD

The present disclosure relates in general to information handling systems, and more particularly to recovering from a crash caused by a corrupted firmware update.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may include several components that each have their own internal firmware. When those firmwares receive updates, there is a chance of corruption (e.g., from a bad update file, a programming bug, a power loss, etc.), which may cause that component or even the entire system to become inoperable.

Embodiments of this disclosure provide techniques for automatically recovering from such firmware corruption events.

It should be noted that the discussion of a technique in the Background section of this disclosure does not constitute an admission of prior-art status. NO such admissions are made herein, unless clearly and unambiguously identified as such.

SUMMARY

In accordance with the teachings of the present disclosure, the disadvantages and problems associated with firmware corruption may be reduced or eliminated.

In accordance with embodiments of the present disclosure, an information handling system may include at least one processor, a memory, and a plurality of information resources each including a firmware. The information handling system may be configured to: periodically perform a backup operation on the firmwares to store at least one functioning version of each firmware; detect a corrupted one of the firmwares; and re-program the corrupted firmware with the corresponding at least one functioning version of the firmware.

In accordance with these and other embodiments of the present disclosure, a method may include an information handling system that includes a plurality of information handling resources each including a firmware periodically performing a backup operation on the firmwares to store at least one functioning version of each firmware; the information handling system detecting a corrupted one of the firmwares; and the information handling system re-programming the corrupted firmware with the corresponding at least one functioning version of the firmware.

In accordance with these and other embodiments of the present disclosure, an article of manufacture may include a non-transitory, computer-readable medium having computer-executable instructions thereon that are executable by an information handling system that includes a plurality of information handling resources each having a firmware for: periodically performing a backup operation on the firmwares to store at least one functioning version of each firmware; detecting a corrupted one of the firmwares; and re-programming the corrupted firmware with the corresponding at least one functioning version of the firmware.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
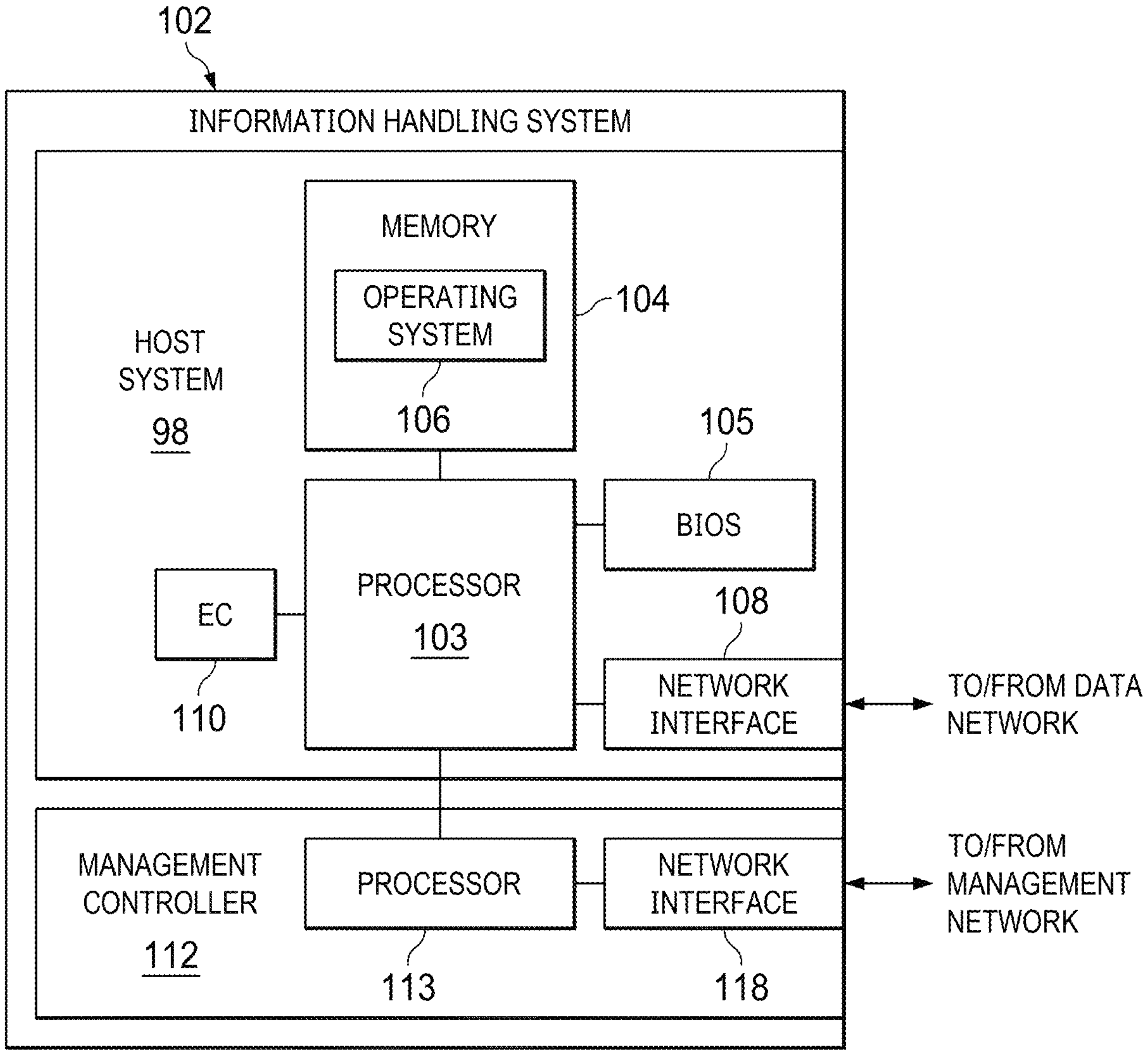
FIG. 1 illustrates a block diagram of an example information handling system, in accordance with embodiments of the present disclosure.
Figure 2:
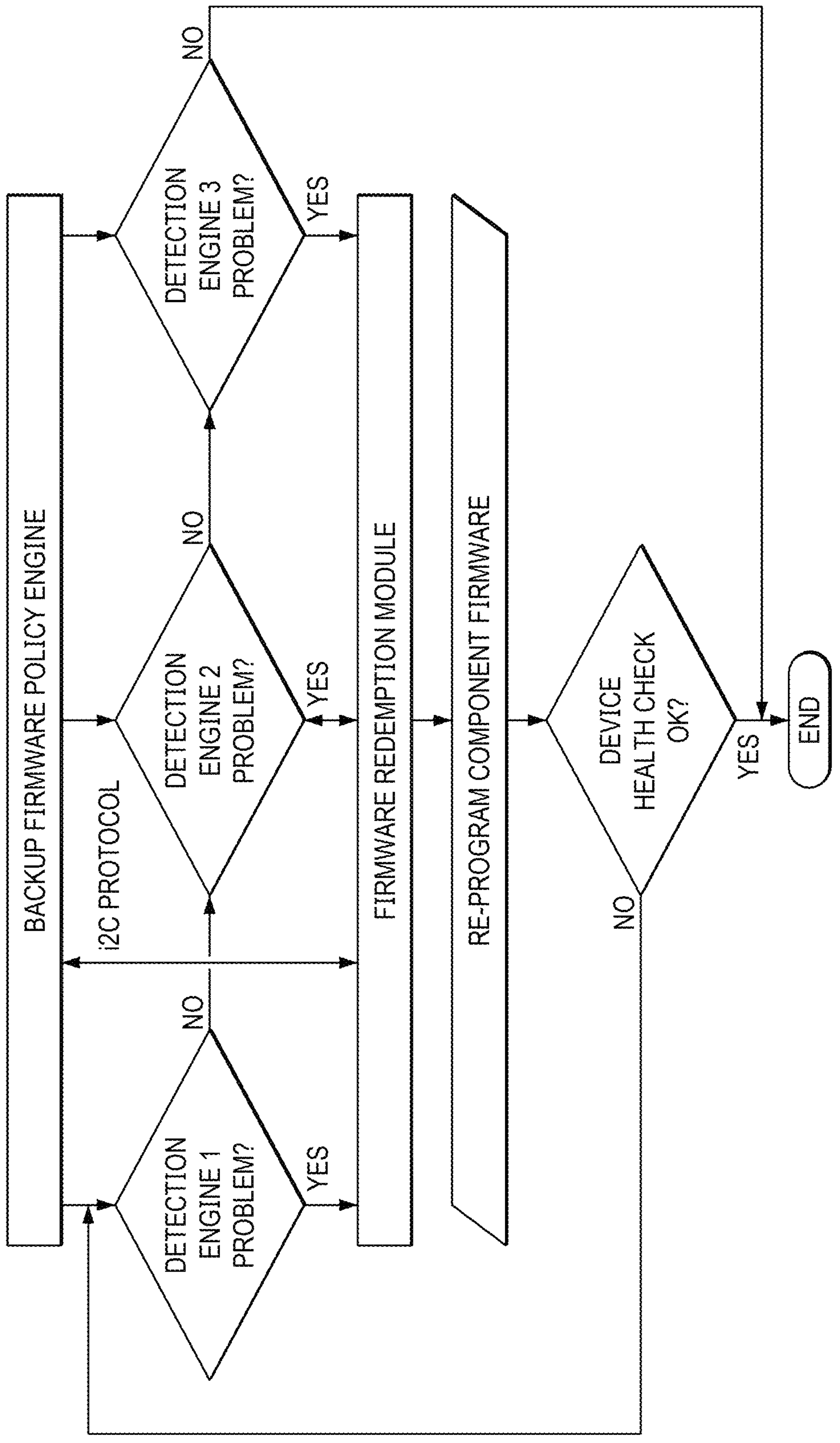
FIG. 2 illustrates an example method, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Information handling system 102 may also include an embedded controller (EC) 110 for carrying out various low-level tasks (e.g., keyboard processing, power management, lighting controls, etc.). EC 110 may include a processor such as a microcontroller, one or more storage elements such as flash storage, etc. The EC may be coupled to processor 103 via a communications link such as I2C, serial peripheral interface (SPI), etc.

As discussed above, information handling system 102 may include various information handling resources that each include a firmware component. During routine updates, one or more of those firmware components may become corrupted for any of a variety of reasons.

Embodiments of this disclosure address the issue of firmware auto-recovery in different components. A firmware redemption module may execute within the system's baseboard management controller (BMC) to perform a re-update or recovery process on the faulty component firmware.

To support the firmware redemption module, during initial component discovery (e.g., during each boot process), the existing and working firmware may be backed up by a backup firmware policy engine, which may execute within the EC or within the BMC. For example, the firmware images may be backed up to a storage resource in the system's EC, a storage resource in the BMC, or any other suitable location. New backups may also be created each time a component firmware is successfully updated.

Instantaneous detection of the firmware corruption may be accomplished via a detection engine, which may run within the BMC or within the component devices themselves. The detection engine may operate by checking the component for malfunctions in some embodiments (e.g., by checking for a lack of connectivity to the component). By implementing this solution, the server system gains the ability to autonomously respond to different firmware crashes and recover automatically, ensuring the continuity of operation in the enterprise devices. An internal VLAN channel using IPv6 link-local communication may be established to detect the communication interruption with the affected component and then reestablish the communication using an OAuth token.

FIG. 2 shows a flowchart of an example method. This example shows three different detection engines for three different chassis components being monitored, but any number of detection engines may be implemented in specific cases.

The firmware redemption module may be used for analyzing the firmware corruption, and it may communicate with the backup firmware policy engine via I2C protocol to back up the firmware of each component and trigger a re-update as needed. A device health check (e.g., a heartbeat mechanism) may perform routine health checks on each component (e.g., using IPMI commands).

Once the backup firmware policy engine collects a copy of all of the working firmware files from each component, then each component-level firmware detection engine may periodically check whether the firmware inside that component is corrupted or not. The firmware detection engine may use an internal protocol such as redfish to read the firmware file and inventory every 10 minutes in one implementation. If any of the firmware detection engines detects firmware corruption, then it activates the firmware redemption module.

Once the process of re-programming the corrupted firmware is completed, then the device health check mechanism may continue to perform routine health checks on each component using IPMI commands. If the device is still not functioning, then the process may try to re-program the corrupted firmware again (e.g., by using a different version of the firmware that has been backed up by the backup firmware policy engine).

One of ordinary skill in the art with the benefit of this disclosure will understand that the preferred initialization point for the method depicted in FIG. 2 and the order of the steps comprising that method may depend on the implementation chosen. In these and other embodiments, the method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

By implementing this solution, the server system gains the ability to autonomously respond to different types of firmware crashes. This helps to avoid manual image re-flashing if any firmware corruption occurs.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:

at least one processor;

a memory; and a plurality of information handling resources each including a firmware;

wherein the information handling system is configured to:

periodically perform a backup operation on the firmwares to store at least one functioning version of each firmware;

detect a corrupted one of the firmwares by detecting a loss of communication with the information handling resource that includes the corrupted firmware; and re-program the corrupted firmware with the corresponding at least one functioning version of the firmware.

2. The information handling system of claim 1, wherein the re-programming is performed by a baseboard management controller (BMC) of the information handling system.

3. The information handling system of claim 1, wherein the at least one functioning version of each firmware is stored on a storage resource of an embedded controller of the information handling system.

4. The information handling system of claim 1, wherein the periodic backup operation is performed each time the information handling system boots.

5. The information handling system of claim 1, further configured to perform periodic health checks of the information handling resources.

6. The information handling system of claim 5, wherein, in response to a failed health check of the information handling resource having the re-programmed corrupted firmware, the information handling system is configured to re-program the corrupted firmware again with a different version of the corresponding at least one functioning version of the firmware.

7. The information handling system of claim 1, wherein the information handling system is further configured to:

detect the corrupted one of the firmwares by detecting the loss of communication over an internal virtual local area network (VLAN) channel using link-local communication, and subsequent to the re-programming, reestablish communication with the information handling resource that includes the corrupted firmware using an OAuth token.

8. A method comprising:

an information handling system that includes a plurality of information handling resources each including a firmware periodically performing a backup operation on the firmwares to store at least one functioning version of each firmware;

the information handling system detecting a corrupted one of the firmwares by detecting a loss of communication with the information handling resource that includes the corrupted firmware; and the information handling system re-programming the corrupted firmware with the corresponding at least one functioning version of the firmware.

9. The method of claim 8, wherein the re-programming is performed by a baseboard management controller (BMC) of the information handling system.

10. The method of claim 8, wherein the at least one functioning version of each firmware is stored on a storage resource of an embedded controller of the information handling system.

11. The method of claim 8, wherein the periodic backup operation is performed each time the information handling system boots.

12. The method of claim 8, further comprising performing periodic health checks of the information handling resources.

13. The method of claim 12, wherein, in response to a failed health check of the information handling resource having the re-programmed corrupted firmware, the information handling system re-program the corrupted firmware again with a different version of the corresponding at least one functioning version of the firmware.

14. An article of manufacture comprising a non-transitory, computer-readable medium having computer-executable instructions thereon that are executable by an information handling system that includes a plurality of information handling resources each having a firmware for:

periodically performing a backup operation on the firmwares to store at least one functioning version of each firmware;

detecting a corrupted one of the firmwares by detecting a loss of communication with the information handling resource that includes the corrupted firmware; and re-programming the corrupted firmware with the corresponding at least one functioning version of the firmware.

15. The article of manufacture of claim 14, wherein the re-programming is performed by a baseboard management controller (BMC) of the information handling system.

16. The article of manufacture of claim 14, wherein the at least one functioning version of each firmware is stored on a storage resource of an embedded controller of the information handling system.

17. The article of manufacture of claim 14, wherein the periodic backup operation is performed each time the information handling system boots.

18. The article of manufacture of claim 14, wherein the instructions are further executable for performing periodic health checks of the information handling resources.

19. The article of manufacture of claim 18, wherein the instructions are further executable for, in response to a failed health check of the information handling resource having the re-programmed corrupted firmware, re-programmng the corrupted firmware again with a different version of the corresponding at least one functioning version of the firmware.

* * * * *